FIG. 1.

INVENTOR.
ARTHUR B. BASSOFF

Aug. 23, 1966  A. B. BASSOFF  3,267,581
CHECKING DEVICE

Filed May 31, 1963  8 Sheets-Sheet 3

INVENTOR.
ARTHUR B. BASSOFF
BY Whittemore,
Hulbert & Belknap
ATTORNEYS

Aug. 23, 1966    A. B. BASSOFF    3,267,581
CHECKING DEVICE

Filed May 31, 1963    8 Sheets-Sheet 4

INVENTOR.
ARTHUR B. BASSOFF
BY Whittemore,
Hulbert & Belknap
ATTORNEYS

United States Patent Office 3,267,581
Patented August 23, 1966

3,267,581
CHECKING DEVICE
Arthur B. Bassoff, Detroit, Mich., assignor to National Broach & Machine Company, Detroit, Mich., a corporation of Michigan
Filed May 31, 1963, Ser. No. 284,440
9 Claims. (Cl. 33—179.5)

The present invention relates to a checking device for very large gears.

It is an object of the present invention to provide a checking device capable of effecting the checking of all critical gear characteristics.

It is a further object of the present invention to provide a gear checking device of the character described including means for cushioning the equipment during placement of a gear thereon to avoid shocks to delicate gear checking mechanism.

It is a further object of the present invention to provide a gear checker having means for driving the gear in rotation including a coupling adapted to connect drive mechanism to the work gear to permit rotation thereof while the axis of the gear is displaced from the axis of the rotating drive mechanism.

It is a further object of the present invention to provide a gear checker having support structure located at opposite sides of the means for mounting a work gear, one of said support structures comprising means for mounting a pinion adapted to mesh with the work gear, the other support structure comprising means for mounting measuring devices adapted to be associated with particular teeth of the work gear.

It is a further object of the present invention to provide means for measuring helix angle, tooth-to-tooth spacing, eccentricity, and other gear characteristics.

Other objects and features of the invention will become apparent as the description proceeds, especially when taken in conjunction with the accompanying drawings, illustrating preferred embodiments of the invention, wherein:

Figure 1:
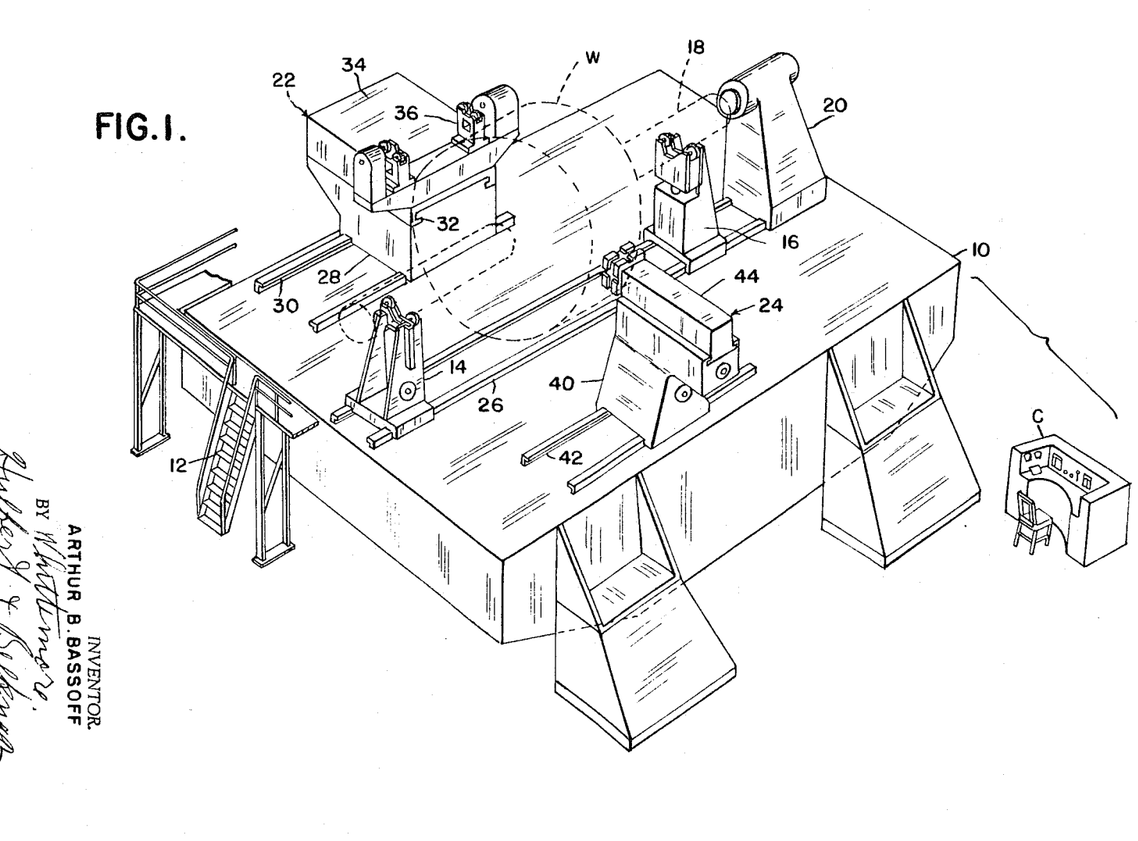
FIGURE 1 is a schematic perspective view of the gear checking device showing the location of the major components, details of which are as shown in the separate views thereof.

Referring first to FIGURE 1 where there is shown more or less schematically the general arrangement of the major components of the device, there is illustrated a raised platform 10 access to which is afforded by stairs 12. Mounted on the platform 10 are journal stands 14 and 16 adapted to support the shaft or journal 18 of a work gear W which is shown on the device in broken lines.

Work drive mechanism is provided and includes a drive stand 20.

The instrumentalities for checking various gear characteristics may be divided generally into devices which require rotation of a master pinion in mesh with the work gear, and those which include measuring devices adapted to be brought into engagement with specific teeth of the gear. At one side of the platform 10 is a roll checking unit indicated generally at 22. At the opposite side of the platform from the roll checking unit 22 is a tooth checking unit indicated generally at 24.

The journal stands 14 and 16 and the work drive stand 20 are mounted on rails 26 and are adjustable thereon to accommodate work gears of different sizes. The roll checking unit 22 comprises a bottom slide 28 adjustable on rails 30 parallel to the axis of the work gear. Mounted on ways indicated at 32 on the bottom slide 28 is a sensitive floating table 34 which carries pinion journal stands 36 adapted to support the shaft or journal 38 of a pinion P in mesh with the work gear W.

The tooth checking unit 24 comprises a bottom slide 40 mounted for adjustment parallel to the axis of the work gear W on rails 42 and includes a tooth checking cross slide 44 movable in a direction perpendicular to the axis of the gear W.

Figure 2:
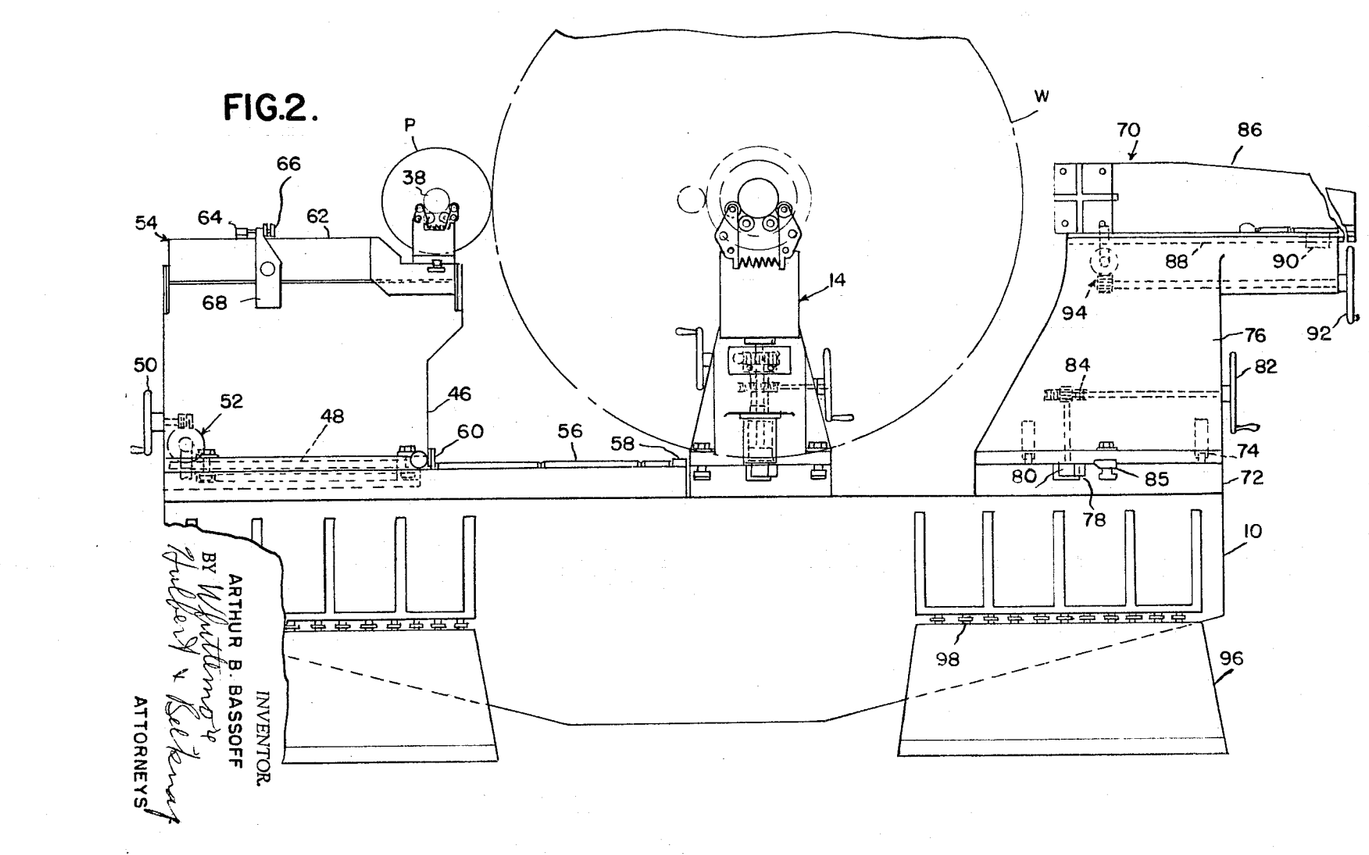
FIGURE 2 is a fragmentary front elevation of the device.

A preferred roll checking unit is illustrated in FIGURE 2 in which adjustment of a bottom slide 46 toward and away from the work gear journal stands is provided by a feed screw 48 driven by a hand wheel 50 through suitable gearing indicated generally at 52. In adjustment of the roll checking unit indicated in FIGURE 2 by the reference character 54, gauge bars 56 are provided which extend between a reference block 58 and an abutment 60 on the slide 46.

On bottom slide 46 is a sensitive slide or table which in FIGURE 2 is indicated at 62. Movement of the slide 62 is determined by an indicator 64 movable with the slide and engageable by the end of an adjustable screw 66 carried by a bracket 68 mounted on the slide 46.

It will of course be apparent that when the master pinion P is in mesh with the work gear W, rotation of the work gear will cause rotation of the pinion P, but the table 62 will remain stationary unless there is runout or eccentricity in the gear W. Moreover, the location of the sensitive table 62, taking into account the accurate initial adjustment of the slide 46, is a direct indication of the size or pitch diameter of the gear W.

A preferred form of tooth checking unit is indicated generally at 70 in FIGURE 2 and comprises a base 72 having ways 74 on which a carriage 76 is slidable in a direction parallel to the axis of the gear W. The base 72 has a rack 78 carried thereby and the carriage 76 has a pinion 80 in mesh with the rack and adapted to be driven in rotation from a hand wheel 82 through gearing indicated at 84. Tapered key 85 insures proper alignment. A cross slide 86 is mounted on the carriage 76 for movement toward and away from the axis of the work gear W and motion of the cross slide is controlled by a screw 88 cooperating with a nut 90 carried by the cross slide, rotation of the screw being by the hand wheel 92 through suitable gearing indicated generally at 94.

The raised platform 10 is mounted on stands 96 and between the stands and the platform 10 are provided vibration isolators 98.

The work gears for which this checking device is designed are extremely heavy and care is required to avoid injury to the sensitive checking mechanism when placing the work gear thereon.

Figure 3:
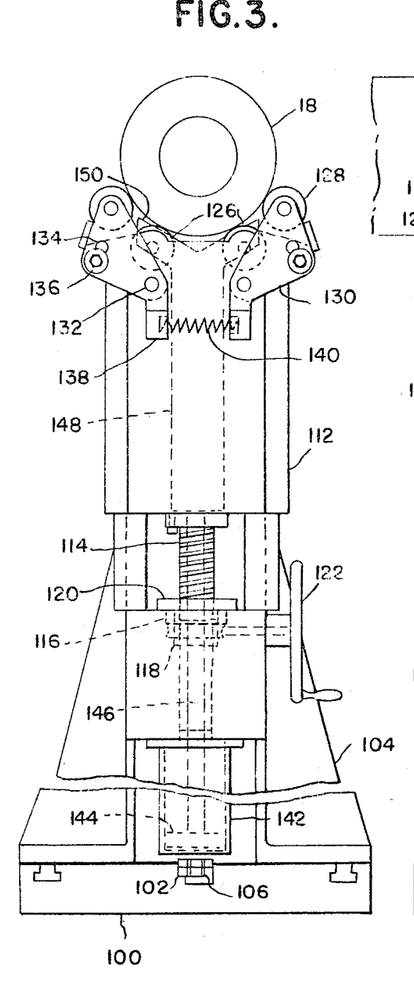
FIGURE 3 is an enlarged elevational view of a gear support pedestal.
Figure 4:
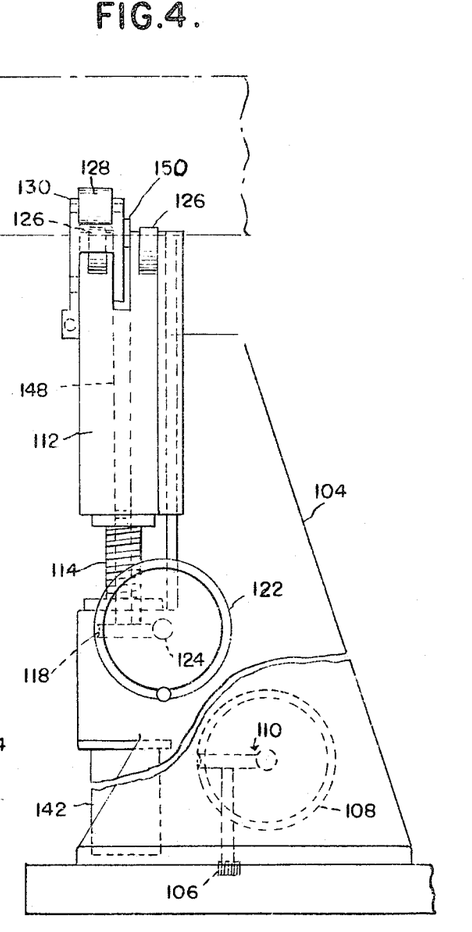
FIGURE 4 is a side elevational view of the pedestal shown in FIGURE 3.

Referring now to FIGURES 3 and 4, details of a preferred work gear journal bearing stand assembly, similar to the stands 14 and 16 shown in FIGURE 1, is illustrated. This journal bearing stand assembly comprises a sub-base 100 carrying a rack 102. Mounted on the sub-base 100 is a journal bearing stand 104 provided with a pinion 106 driven from a hand wheel 108 through suitable gearing indicated at 110. Rotation of the hand wheel 108 causes movement of the journal bearing stand on the sub-base 100 in a direction parallel to the axis of the work gear thereon.

Mounted for vertical movement on the journal bearing stand 104 is a main slide 112. A hollow jack screw 114 is bolted to the underside of the slide 112 and cooperates with a rotatable nut 116 which is fixed to a worm gear 118. The nut and worm gear include a mounting flange 120.

A hand wheel 122 includes a worm 124 in mesh with the worm gear 118 so that upon rotation of the hand wheel vertical movement is imparted to the main slide 112.

At its upper end the main slide 112 has four rollers 126 on which the shaft or journal 18 of the work gear W is adapted to rest. The main slide 112 is vertically adjustable to position the center line of the work gear at the height required for cooperation with the checking devices.

Means are provided on the main slide to confine the shaft or journal of the work gear against lateral movement and this means comprises rollers 128 mounted on levers 130 pivoted to the main slide 112 at 132. Levers 130 are provided with elongated slots 134 and clamping screws 136 extend through these slots into threaded holes in ears provided on the main slide 112 so as to clamp the rollers 128 in position against the work gear shaft or journal 18. The levers 130 have depending ears 138 recessed to receive a compression spring 140 which urges the ears apart and which biases the rollers 128 inwardly toward the shaft or journal 18.

Located in the journal bearing stand 104 is a hydraulic cylinder 142 having a piston 144 therein connected to a piston rod 146 which extends upwardly through the hollow jack screws 114. Vertically slidable in the main slide 112 is a plate 148 terminating at its upper end in upwardly and outwardly diverging arms 150 forming a V. The purpose of the vertically movable V's is to receive the work gear and for this purpose, when a work gear is to be loaded on the checking device the V's are elevated by the application of hydraulic pressure to the cylinders 142, raising the V's above the rollers 126. At this time the work gear is lowered into position by a crane or overhead conveyor, and since the V's are positioned above the rollers 126 they prevent the rollers and associated mechanism from injury due to impact. After the gear has been moved into engagement with the V's, the V's are gradually lowered by permitting the escape of hydraulic fluid from the cylinders so as to bring the work gear shaft or journal portions 18 gently into supported relation on the rollers 126.

Figure 5:
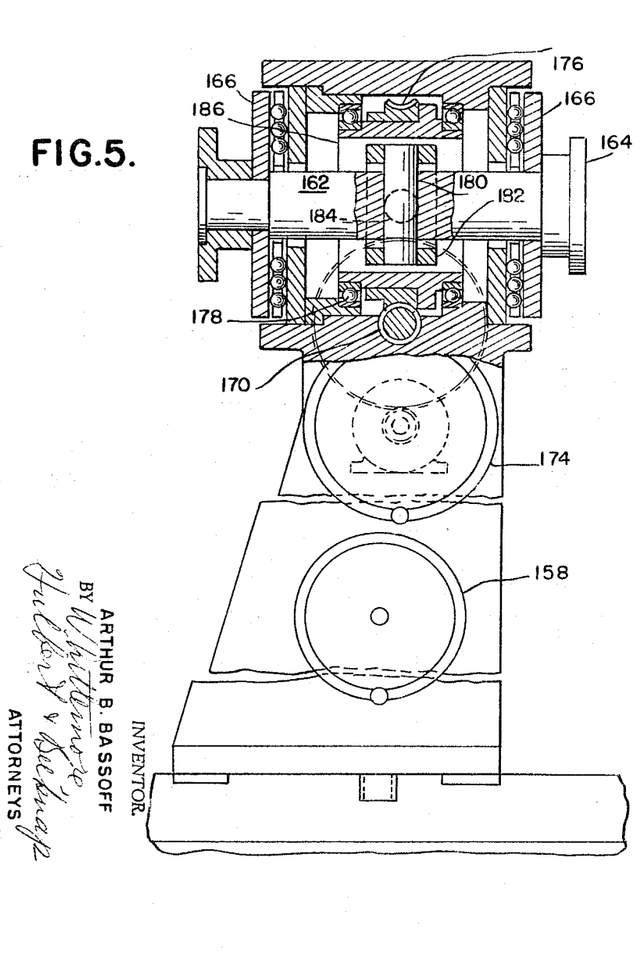
FIGURE 5 is a side elevational view partly in section, of work drive mechanism.
Figure 6:
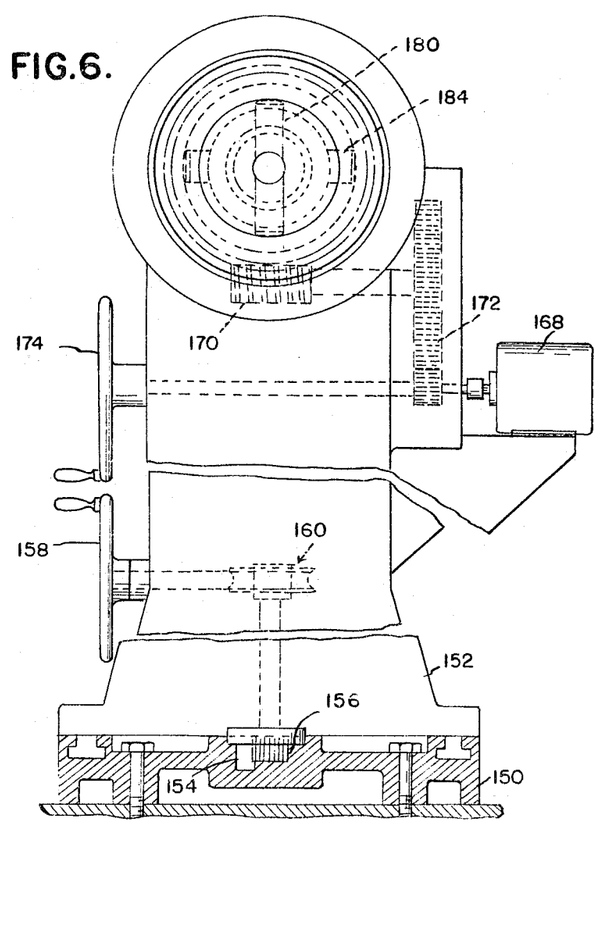
FIGURE 6 is a front elevational view of the mechanism shown in FIGURE 5.

Referring now to FIGURES 5 and 6 there is shown the details of a preferred work drive mechanism. The construction consists of a sub-base 150 on which the work drive stand 152 is adjustable. The sub-base 150 has a rack 154 thereon and the stand 152 carries a pinion 156 meshing with the rack. The pinion 156 is rotatable by a hand wheel 158 through suitable gearing indicated generally at 160.

At the top of the stand 152 is a drive spindle 162 having a spindle nose 164 adapted to be connected by an adaptor with the end of the work gear. The shaft or spindle 162 is permitted limited transverse movement but is prevented from moving endwise by thrust bearings indicated at 166. The limited transverse movement permitted to the shaft 162 is for the purpose of permitting the shaft to drive a work gear even though there is some misalignment between the axis of the shaft 162 and the axis of the work gear.

Actual drive of the shaft 162 may be from a motor 168 driving a worm 170 through gearing indicated generally at 172. A hand wheel 174 is also provided which may be used to rotate the shaft 162 by hand.

The worm 170 meshes with a worm gear 176 which is mounted for rotation on bearings indicated at 178. Intermediate the worm gear 176 and the shaft 162 is an Oldham coupling comprising a pin 180 slidable in a ring 182, the ring 182 slidably carrying pins 184 which connect it to the ring 186 carrying the worm gear 176.

Figures 7, 8:
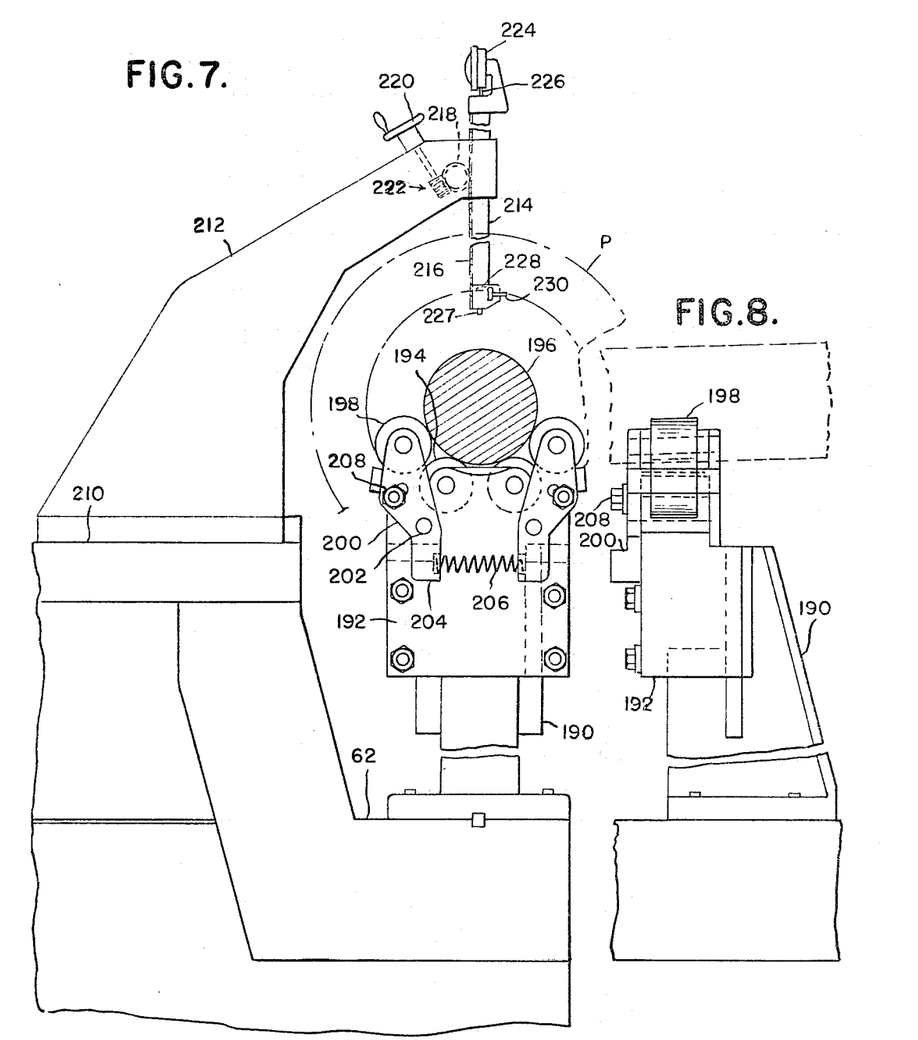
FIGURE 7 is a fragmentary elevational view of a pinion support pedestal.
FIGURE 8 is a view of the pedestal shown in FIGURE 7 and seen from the right.

Referring now to FIGURES 7 and 8 there are shown details of a preferred pinion journal stand and checker. Mounted on the sensitive table 62 of the roll checking unit is a journal bearing stand 190 on which a slide 192 is vertically adjustable. The slide 192 has mechanism for effecting vertical adjustment which may be identical with the feed screw and nut mechanism shown in FIGURES 2 and 3 for effecting vertical adjustment of the main gear supporting slide 112. The slide 192 carries rolls 194 for engaging the shaft 196 of a pinion P.

Associated with the rolls 194 are rolls 198 adapted to support the pinion P against transverse movement. The rolls 198 are carried by levers 200 which are pivoted as indicated at 202 to the slide 192 and are provided with depending ears 204 between which is provide a compression spring 206 urging the rolls 198 into engagement with the shaft 196. In assembly, clamping screws 208 are tightened to lock the levers 200 in position.

The sensitive table 62 has an accurately finished upper flat surface 210 and on this surface is placed a bracket 212 having a correspondingly accurately finished undersurface. The bracket 212 is formed to extend over the pinion shaft 196 and carries a vertically movable elongated element 214 provided with rack teeth 216 engaged by a pinion 18 driven from a hand wheel 220 by suitable gearing indicated generally at 222. At its upper end the element 214 carries a sensitive indicator 224 actuated by a vertically movable rod 226. Associated with the rod 226 is a vertically movable contact 227 and lever 228 provided with a lateral contact 230. With the mechanism described, the element 214 may be lowered into position so that the contact 227 engages the shaft 196 at its top. In order to check the lateral position of the shaft 196, the bracket 212 may be moved to the left as seen in FIGURE 7, and the element 214 lowered until the contact 230 is in the horizontal plane of the axis of the shaft 196 at which time the contact may be brought into engagement with the shaft for checking its position.

Figure 9:
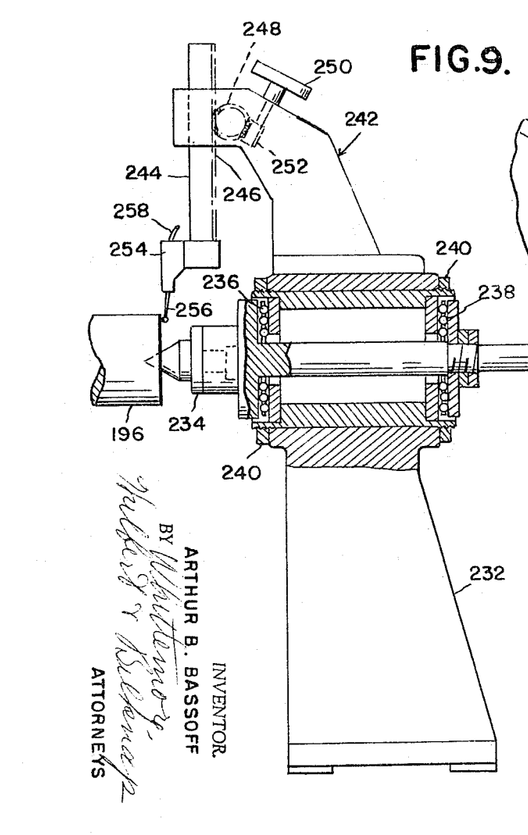
FIGURE 9 is a center support pedestal.

Referring now to FIGURE 9 there is shown means for either supporting the end of the pinion shaft or for measuring its endwise movment as occasion requires.

This mechanism comprises a pedestal 232 which is adjustable along the table surface of the roll checking unit. Adjacent its upper end the pedestal 232 is provided with a center 234 supported against endwise movement by thrust bearings 236 and 238, the assembly being clamped in position by nuts 240. With this arrangement the center 234 may engage a recess at the end of the pinion shaft 196 and will support it against endwise movement.

Alternatively, in some cases it may be desirable to permit endwise movement of the pinion shaft, as for example when checking end float of herringbone pinions. In this case of course the center 234 is not engaged with the shaft 196. A checking unit 242 is provided which is shown as positioned on the top of the pedestal 232. The checking unit 242 includes a vertically adjustable bar 244 having rack teeth 246 thereon associated with a pinion 248 driven from a knurled knob 250 through suitable gearing indicated at 252. At its lower end the bar 244 is provided with a sensing unit 254 which includes a movable finger 256. The sensing unit may be of conventional type including an electrical connection 258 to suitable electronic mechanism.

Figure 10:
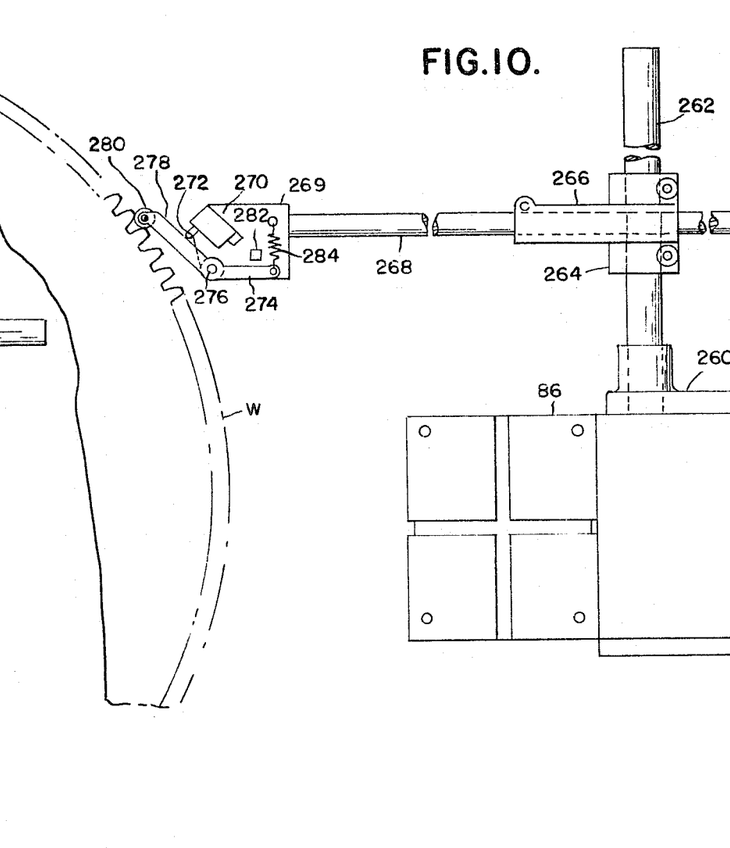
FIGURE 10 is a fragmentary elevational view of index control mechanism.

Referring now to FIGURE 10 there is illustrated index mechanism associated with the checker. In this case, mounted on the tooth checking cross slide 86 is a stand 260 provided with a vertical post 262 on which is slidable a clamp 264. The clamp 264 has a generally horizontally extending clamping sleeve 266 in which is longitudinally slidable a rod 268. At the end of the rod there is provided a head 269 having a switch 270 having a plunger 272 thereon. The head 269 carries a lever 274 pivoted to the head as indicated at 276 and including an arm 278 carrying a roller 280. The roller 280 is dimensioned to enter substantially into spaces between adjacent teeth of the work gear W. The head 269 is provided with a stop 282 and the lever 274 is connected to a tension spring 284 which urges the roller 280 against the periphery of the work gear W.

The mechanism is adjusted so that full entry of the roller 280 into a tooth spaced will provide actuation of the switch 270. As the work gear W is rotated the switch 270 will be opened and closed once as each tooth passes the roller 280.

By the use of a plugging relay or the like controlled by the switch 270, it is possible to control the starting and stopping of work gear rotation within close limits at each tooth or multiple of teeth thereof. Also, the switch may be used as a counter since it will send a pulse to the counter and recording instruments located at the control console C.

Figures 11, 12, 13:
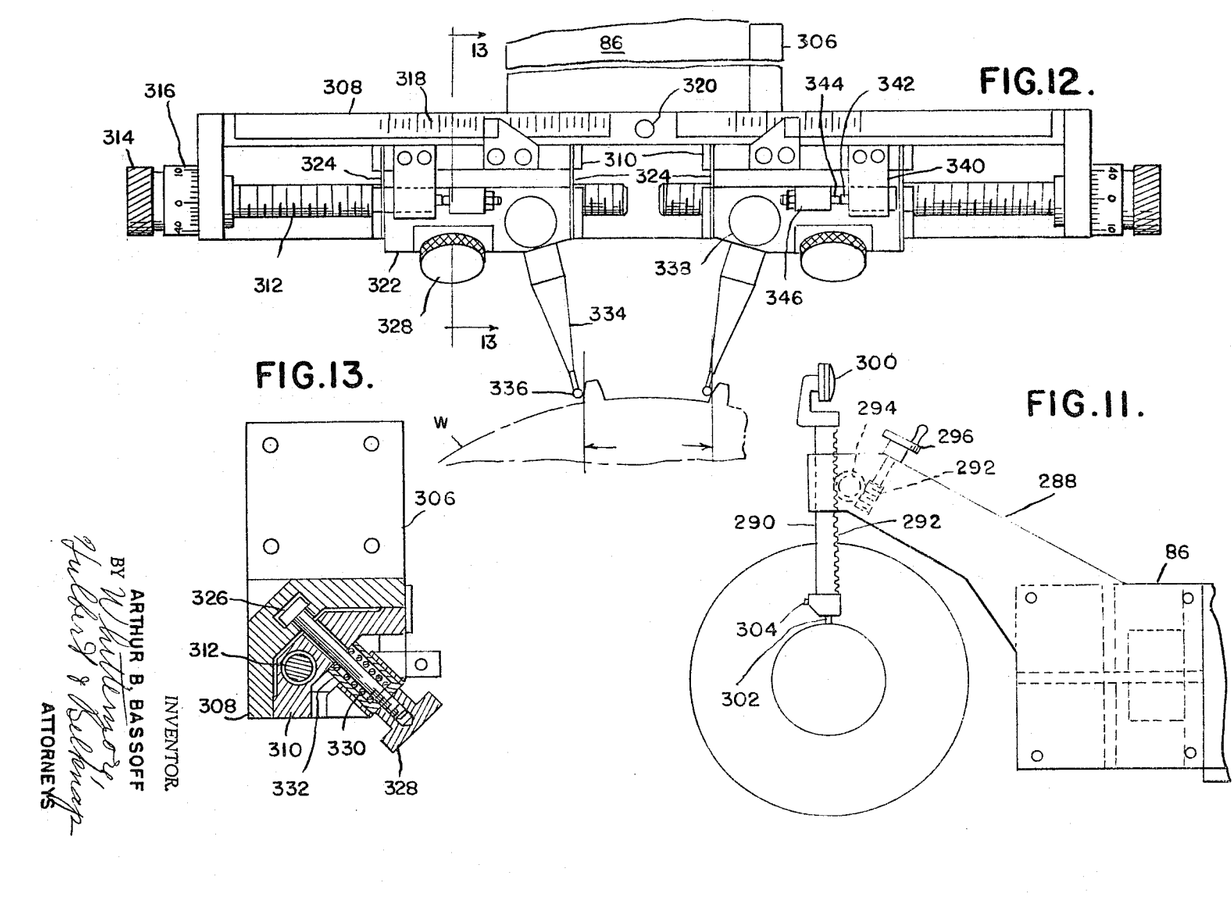
FIGURE 11 is an elevational view of journal checking structure.
FIGURE 12 is an elevational view of a tooth space measuring device.
FIGURE 13 is a section on the line 13—13, FIGURE 12.

Referring now to FIGURE 11 there is illustrated journal checking mechanism associated with the shaft or journal of the work gear W. This is similar to the journal checking structure employed in association with the pinion. The cross slide 86 of the tooth checking unit has an arm 288 connected thereto carrying at its outer end a vertically movable bar 290 having rack teeth 292 thereon. Associated with the rack teeth 292 is an pinion 294 and a hand wheel 296 is provided for rotating the pinion through worm gearing indicated at 298. An indicator 300 is provided which is adapted to be actuated by vertical movement of contact 302 or horizontal movement of contact 304. It will of course be observed that for employing the horizontally movable contact 304, the bar 290 will have been lowered to position the contact 304 in the horizontal plane containing the axis of the work gear W.

Referring now to FIGURES 12 and 13 there is illustrated mechanism for checking gear tooth spacing. The mechanism is designed for connection to the cross slide 86 of the tooth checking unit and as illustrated, comprises a flange 306 for attachment thereto. The mechanism comprises a frame 308 on which a pair of slides 310 are movable, adjustment of the slides 310 being accomplished by fine pitch screws 312 having knobs 314 and provided with graduated scales 316. For coarse adjustment scales 318 are provided on the frame 308.

A central plug 320 is provided for use in association with gauge blocks for setting the slides 310 with micrometer precision.

Floating gauge blocks 322 are connected to the plates 310 by flexible reeds 324 which permits substantially free movement of the gauge blocks 322 with reference to the slides 310. Clamping means are provided for clamping the slides 310 in accurately adjusted position and this means comprises T-bolts 326 having clamping knobs 328 threaded thereto. Compression springs 330 are provided in cups 332 to maintain the slides 310 in firm contact with the frame 308 when the knobs 328 are loosened.

Each of the gauge blocks 322 is provided with sensing fingers 334 having ball ends as indicated at 336 for engagement with the sides of teeth of the work gear W. The fingers 334 are held in the gauge blocks 322 by means of clamp screws, the heads of which are indicated at 338. Sensing means, herein illustrated as linear variable differential transformers 340, are provided on the slides 310 and includes displacement plungers 342 engageable adjustable actuating screws 344 carried by lugs 346 on the gauge blocks 322.

The linear variable differential transformers are extremely sensitive and may be connected by suitable conductors (not shown) to electronic equipment located within the control console C. This equipment may be used to determine tooth-to-tooth spacing error and also to determine total accumulated error.

Referring now to FIGURES 14–17 there is illustrated equipment for checking lead in a number of different ways. The equipment comprises a sub-plate 350 which may be attached to the cross slide 86 of the tooth checking unit. Mounted on ball bearing ways 352 on the sub-plate 350 is the main plate 354. Mounted for rotation on the main plate 354 is a circular plate 356. Means are provided between the plates 354 and 356 for effecting rotation of the circular plate 356 and this means comprises a worm gear 358 and a worm 360 actuated by a shaft 362 having a knob 364 thereon. The circular plate 356 may be locked in adjusted position by nuts and T-bolts indicated generally at 366, associated with circular T-slots 368.

Figure 14:
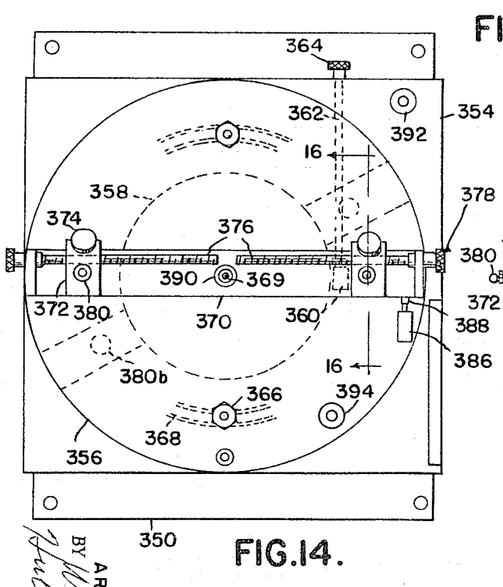
FIGURE 14 is an elevational view of a lead checking device.
Figures 15, 16, 17, 18, 19:
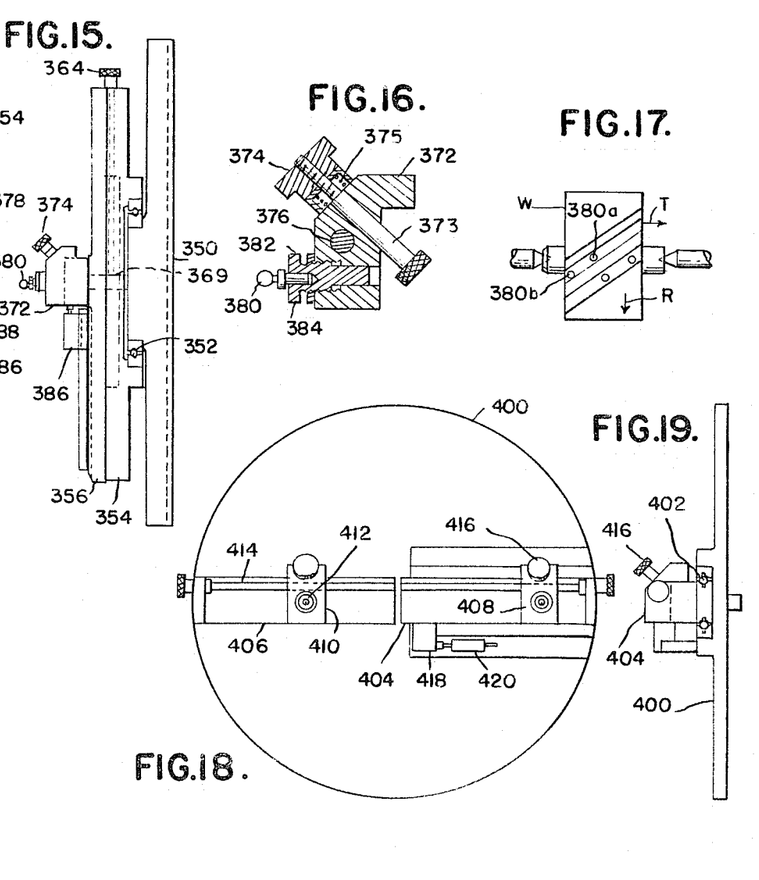
FIGURE 15 is an end view of the device shown in FIGURE 14.
FIGURE 16 is an enlarged fragmentary section on the line 16—16, FIGURE 14.
FIGURE 17 is a diagrammatic view illustrating the manner of using the checking equipment shown in FIGURES 14–16.
FIGURE 18 is an elevational view of a plate for alternate use with a similar plate provided in the mechanism of FIGURE 14.
FIGURE 19 is a side elevation of the plate shown in FIGURE 18.

Mounted for rotation about a center pivot pin 369 is a guide bar 370 and slidable on this guide bar are a pair of ball pin supporting blocks 372. Details of these blocks are best illustrated in FIGURE 16 and it will be observed that each block has associated therewith a T-bolt 373 the head of which is slidable in a T-slot extending longitudinally of the guide bar 370. Associated with the bolt 373 is a nut 374 having a knurled head and a compression spring 375 which retains the block 372 in position by maintaining friction with the bar 370 when the clamping nuts 374 are loosened. Adjustment of the blocks 372 longitudinally of the bar 370 is accomplished by screws 376 having knurled heads 378 and extending through threaded openings in the blocks 372. Each of the blocks 372 has a ball headed contact 380 which is removably positioned in a recess in an adjusting screw 382 and is clamped therein by a set screw 384.

Means are provided for sensing rotation of the bar 370 relative to the angularly adjustable plate 356 and this means comprises an electronic sensing head 386 mounted on the plate 356 having a movable plunger 388 engaging the pivotally mounted bar 370.

With the construction as so far described, the device may be used for checking lead or helix angle in a number of different ways. In the first place, plunge checking may be accomplished so that the lead or helix angle of any one tooth or tooth space may be determined, and the determination will not be influenced by any tooth spacing error. To accomplish this check the two ball contacts 380 are equally spaced relative to the center pivot 369 at any desired distance and the circular plate 356 is angularly adjusted to the proper helix angle. With the parts thus adjusted, the cross slide 86 is moved toward the work gear to cause the ball contacts 380 to enter into the same tooth space. If this tooth space extends at the correct lead or helix angle there will be no displacement of the pivoted bar 370. On the other hand, any lead or helix error will displace the bar and its displacement will be measured by the electronic sensing head 386 which is connected to send the appropriate signal to the control console C.

Alternately, a lead check may be made across the face of the gear. In order to accomplish this, one of the ball contacts 380 is adjusted into concentricity with the axis of the pivot pin 369, which position is indicated at 380a in FIGURE 17. The other pin may be spaced at any desired or convenient distance away from the center.

The plate 356 is then angularly adjusted to the correct lead or helix angle adjustment, so that the last mentioned ball contact moves to the position indicated at 380b, and the checking device advanced so that the pins engage in the same tooth space of the gear. This of course will require relative adjustment between the pins 380 since one of these pins is on center and the other pin is displaced laterally. Thereafter, the gear is rotated and due to the helix angle of its teeth, rotation of the gear will displace the main slide 354 longitudinally on the ball bearing ways 352. Any variation in lead or helix angle across the face of the gear will cause displacement of the bar 370 relative to the angularly adjustable plate 356 which will be sensed by the head 386. Rotation of the gear W in the direction of the arrow R will result in travel of the main slide 354 in the direction of the arrow T.

In checking spur gears the plate 356 is rotated so that the ball contacts 380 are parallel to the work axis and the device is moved to cause the ball contacts to enter the same tooth space. Any deviation from tooth parallelism will be sensed by the electronic sensing head 386.

Accuracy in adjustment is provided for by the use of gauge blocks and pins. The bar 370 is provided with a center gauge pin 390 and gauge blocks may be used to insure accurate positioning of the slidable blocks 372. A lock-out pin 392 is provided between the base plate 350 and the main plate 354 to insure accurate location in central position. Similarly, a lock-out pin indicated 394 is provided between the angulary adjustable plate 356 and the main plate 354.

Referring now to FIGURES 18 and 19 an angularly adjustable circular plate 400 is provided which replaces the plate 356 on the main plate 354. On the plate 400 there are provided ball bearing ways 402 on which an elongated bar 404 is longitudinally slidable. Fixedly mounted on the plate 400 is a second bar 406. Slidable on the bars 404 and 406 are adjustable blocks 408 and 410 respectively. Each of these blocks carries adjustable ball contacts 412 which may be in all respects identical with contacts 380 previously described. The blocks 408 and 410 are longitudinally adjustable on the bars 404 and 406 by fine thread screws 414 and are clamped in adjusted position by clamping screws 416.

The longitudinally movable bar 404 is provided with a laterally extending arm 418 and mounted on the plate 400 is an electronic sensing head 420 having a plunger engageable by the arm 418.

In order to effect a composite lead check parallel to the gear axis across several teeth, the ball contacts are set at a carefully calculated distance. Thereafter, by the plunge method the ball contacts are caused to enter different tooth spaces. If the helix angle or lead of the gear is correct, there will be no displacement of the slidable bar 404. If however, there is a deviation in lead or helix angle, the bar 404 will be displaced in order to permit the ball contact carried by the block 408 to enter the tooth space. This displacement of the bar 404 will be sensed by the electronic sensing head 420 and the information transmitted by suitable conductor to the control console C. It will be apparent that this check is made across several teeth and is accordingly affected by tooth spacing.

The tooth checking unit may be provided with a suitable involute checker such for example as disclosed in my copending application Serial No. 240,996, filed November 29, 1962, now Patent No. 3,283,331, issued February 8, 1965, but it is believed desirable to avoid complicating the present disclosure by including details of this involute checker. This is particularly true since different involute checkers capable of being used by the present gear checker are available.

The drawings and the foregoing specification constitute a description of the improved checking device in such full, clear, concise and extact terms as to enable any person skilled in the art to practice the invention, the scope of which is indicated by the appended claims.

What I claim as my invention is:

1. A checking device for very large gears comprising a platform, gear support means comprising a pair of shaft supporting members spaced apart on said platform to mount a relatively heavy gear therebetween for rotation about a horizontal axis, a roll checking unit positioned on said platform at one side of the gear support means, means mounting said roll checking unit for adjustment on said platform in a direction parallel to the axis of a work gear on said gear support means, said roll checking unit including a sensitive table movable horizontally in a direction perpendicular to the axis of said gear, a master pinion on said sensitive table adapted to mesh with a work gear and to rotate therewith, means for sensing displacement of said master pinion resulting from rotation thereof, a tooth checking unit on said platform at the opposite side of said gear support means from said roll checking unit, means mounting said tooth checking unit for adjustment on said platform in a direction parallel to the axis of a gear on said gear support means, said tooth checking unit including a cross slide movable horizontally in a direction perpendicular to the axis of the work gear, checking means on said cross slide including movable members having portions engageable with the teeth of the work gear, and means for sensing movement of the members in accordance with variations in gear characteristics.

2. A device as defined in claim 1 comprising a drive unit mounted on said platform, and a flexible coupling for connecting said drive unit to a work gear.

3. A device as defined in claim 1 comprising means mounting said pinion with provision for endwise movement, and checking means for measuring such movement.

4. A checking device for very large gears comprising a platform, a pair of journal stands spaced apart on said platform, vertically adjustable slides on said stands, a plurality of rollers on said slides for supporting the shaft of a massive work gear for rotation thereon, an upwardly open V-block vertically slidable on each of said journal stands and movable between positions slightly above and slightly below said rollers to receive a work gear, means for effecting controlled vertical movement of said V-blocks to provide for lowering of a massive work gear onto said rollers without substantial impact.

5. A device as defined in claim 4 comprising jack screws connected to said slides for adjusting them vertically.

6. A device as defined in claim 4 in which said jack screws are hollow and the means for moving said V-blocks vertically comprise elongated elements extending through said jack screws.

7. A device as defined in claim 4 comprising hydraulic piston and cylinder devices connected to said elongated elements.

8. A device as defined in claim 4 comprising lateral support rollers, levers mounting said rollers pivotally connected to said slides, and means for clamping said levers in fixed position with the rollers thereon engaging the sides of a work gear shaft.

9. A device as defined in claim 8 comprising resilient means connected to said levers to urge the rollers carried thereby against the work gear shaft.

(References on following page)

References Cited by the Examiner

UNITED STATES PATENTS

| | | | |
|---|---|---|---|
| 1,554,646 | 9/1925 | Olson | 33—179.55 |
| 1,627,074 | 5/1927 | Blari et al. | 82—8 |
| 2,470,404 | 5/1949 | Kloos | 33—174 |
| 2,489,597 | 11/1949 | Swancon | 33—174 |
| 2,609,609 | 9/1952 | Moss | 33—174 |
| 2,621,417 | 12/1952 | Schulte | 33—179.5 |
| 2,637,908 | 5/1953 | Hedman | 33—179.5 |
| 2,661,542 | 12/1953 | Bean | 33—179.52 |
| 2,669,028 | 2/1954 | La Femina | 33—179.52 |
| 2,697,283 | 12/1954 | Leuthold | 33—179.5 |
| 2,775,041 | 12/1956 | Pomernacki | 33—179.5 |
| 2,821,024 | 1/1958 | Nyland | 33—179.52 |
| 2,835,982 | 5/1958 | Boppel | 33—174 |

LEONARD FORMAN, *Primary Examiner.*